United States Patent

Munn et al.

[15] 3,678,310

[45] July 18, 1972

[54] INSTRUCTIONAL ELECTRIC MOTOR

[72] Inventors: David E. Munn, Framingham; Robert Maddestra, Hyde Park, both of Mass.

[73] Assignee: Damon Corporation, Needham, Mass.

[22] Filed: June 30, 1971

[21] Appl. No.: 158,295

[52] U.S. Cl..............................310/40 MM, 310/1, 310/154
[51] Int. Cl...................................................................H02k
[58] Field of Search..............310/1, 46, 154, 268, 157, 254, 310/40 MM, 269

[56] References Cited

UNITED STATES PATENTS

| | | | |
|---|---|---|---|
| 275,237 | 4/1883 | Marcus | 310/154 X |
| 1,822,342 | 9/1931 | Ehrlich | 310/254 X |
| 2,404,331 | 7/1946 | Werner | 310/46 |
| 3,023,335 | 2/1962 | Burr | 310/268 |
| 3,247,407 | 4/1966 | Bruneel | 310/268 X |

*Primary Examiner*—D. F. Duggan
*Attorney*—Herbert W. Kenway et al.

[57] ABSTRACT

An electric motor that can be assembled by hand. The motor comprises a base having a plurality of holes in its periphery for housing bar magnets and a central elevated portion having metal contact means that can be attached to a power source. An armature is rotatably mounted on the central portion of the base and has a continuous coil thereon, with each end of said coil contacting the metal contact means.

4 Claims, 4 Drawing Figures

PATENTED JUL 18 1972

3,678,310

INVENTOR
DAVID E. MUNN
ROBERT MADDESTRA

BY

Kenway, Jenney & Hildreth
ATTORNEYS

INSTRUCTIONAL ELECTRIC MOTOR

ELECTRIC MOTOR

This invention relates to an electric motor which permits instruction of the principles involved in the construction and operation of single and multi-poled electric motors.

It would be highly desirable to provide a means by which the principles involved in the construction and operation of electric motors could be presented in a simple manner. These principles can best be taught when the student actually constructs a motor under supervision and is provided with an explanation of how the parts of the motor interact to obtain powered rotation of the armature. Thus, it would be desirable to provide an apparatus which could be assembled by hand and which permits viewing of all the major components of the motor during operation.

The present invention provides an electric motor assembly that can be constructed by hand without tools so that, when assembled, all the major components of the motor can be viewed. The motor comprises a base having a plurality of holes therein to accommodate and retain bar magnets in a vertical position. The base has a central portion which is adapted to accommodate a shaft and electrical contacts and which is elevated from the surface into which the bar magnets are placed. The contacts are placed in the elevated surface so that they extend substantially the entire circumference of the elevated surface and are provided with tabs to which can be attached contacts from a power source. An armature is rotatably mounted on a shaft extending vertically from the elevated surface and is shaped so that the coil can be wound thereon.

The invention will be more fully described with reference to the accompanying drawings.

Figure 1:
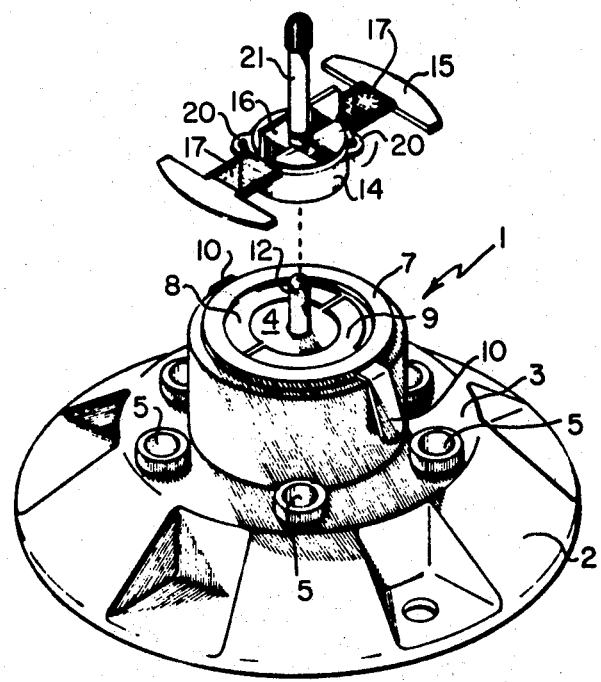
FIG. 1 is an isometric view of the motor of this invention.
Figure 3:
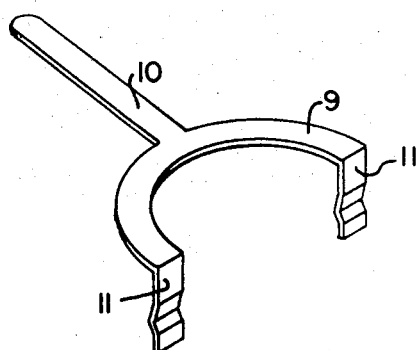
FIG. 3 is an isometric view of the metal contact.
Figure 4:
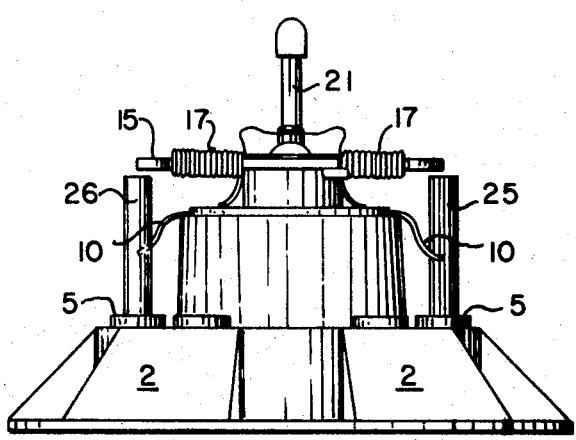
FIG. 4 is a side view of the assembled motor.

Referring to FIGS. 1, 3 and 4, the motor 1 comprises a base 2 having an intermediate surface 3 and a raised surface 4. The intermediate surface 3 is provided with a plurality of holes 5 into which can be placed bar magnets in a vertical position. The top surface 4 is provided with a lip 7 extending circumferentially around the surface 4. The surface 4 is adapted to accommodate two electrical contacts 8 and 9 each being of generally semi-circular shape and having a tab 10 extending therefrom. The tabs 10 extend through holes in the lip 7 and tabs 11, at each semi-circular end, are adapted to fit into holes in the surface 4 so that the contacts 9 and 8 are retained on the surface 4. A shaft 12 extends from the center of surface 4 and is adapted to fit into a bore on the bottom surface of armature holder 14. Armature 15 fits onto holder 14 and is retained thereon by nut 16. Coil windings 17 are placed on the armature 15 and the ends of the windings 15 are passed through holes in tabs 20 and these winding ends function as brushes when contacting the contacts 8 and 9. Shaft 21 provides a convenient means for initiating spin of the armature 15 by hand or as a means on which a line can be attached to perform work.

In operation, an electrical power source is connected with tabs 10 and the magnets 25 and 26 are arranged so that those in opposite radial positions have a different pole adjacent the armature 15. As shown, the base 2 can be provided with indentations 2a to facilitate fixing the entire motor by any conventional clamping means.

Figure 2:
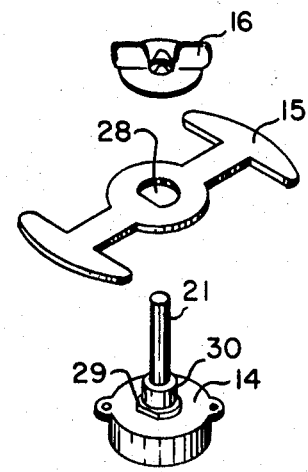
FIG. 2 is an exploded view of the armature assembly without the coil.

Referring to FIG. 2, the armature assembly comprises the holder 14, a shaft 21 an armature 15 and a nut 16. The armature 15 has a hole 28 which fits over shoulder 29 of holder 14. The holder 14 also is provided with an additional shoulder 30 so that two inclined surfaces of the nut 16 contact the shoulder and can be screwed into position to retain the armature 15 in contact with the shoulder 14.

It is to be understood that the present invention is not limited to the specific embodiment shown in the drawings. Thus, the present invention includes any construction having a base housing a plurality of removable magnets on the periphery thereof and a rotatable armature in a central position whereby the armature is free to rotate out of contact with the magnets.

We claim:

1. An electric motor comprising a base having a plurality of holes each adapted to house a magnet, said base having a central surface elevated from said holes, metal contact means on said central surface, a shaft extending vertically from the central portion of said central surface, and an armature having a metal wire coil rotably mounted on said shaft, with said coil having each end in contact with said contact means, said magnets being exposed to view and being vertically oriented substantially parallel with said shaft.

2. The motor of claim 1 wherein said armature is fixedly mounted to a second shaft extending vertically from the plane of the armature rotation.

3. The motor of claim 1 having two magnets each in radially opposed holes in said base.

4. The motor of claim 1 having one magnet in a hole in said base.

* * * * *